US005789485A

United States Patent [19]

Kobayashi et al.

[11] Patent Number: 5,789,485
[45] Date of Patent: Aug. 4, 1998

[54] CURABLE SILICONE COMPOSITIONS

[75] Inventors: Akihiko Kobayashi; Takayoshi Otomo; Hiroaki Yoshida, all of Chiba Prefecture, Japan

[73] Assignee: Dow Corning Toray Silicone Co., Ltd., Tokyo, Japan

[21] Appl. No.: 773,746

[22] Filed: Dec. 24, 1996

[30] Foreign Application Priority Data

Dec. 28, 1995 [JP] Japan ................................ 7-352802

[51] Int. Cl.$^6$ ................................ C08F 8/00; C08J 9/00
[52] U.S. Cl. ........................ 525/100; 427/387; 524/101; 524/265; 524/718; 524/765; 524/773; 524/783; 524/785; 524/806; 524/837; 524/847; 524/848; 528/15
[58] Field of Search .................. 427/387; 524/101, 524/265, 718, 765, 773, 783, 785, 588, 806, 837, 847, 848; 525/100; 528/15

[56] References Cited

U.S. PATENT DOCUMENTS

| | | | |
|---|---|---|---|
| 4,182,824 | 1/1980 | Suzuki et al. | 528/15 |
| 4,721,764 | 1/1988 | Fujiki et al. | 528/15 |
| 4,786,701 | 11/1988 | Tanaka | 528/15 |
| 4,912,188 | 3/1990 | Colas et al. | 528/15 |
| 5,356,719 | 10/1994 | Hamada et al. | 428/447 |
| 5,378,742 | 1/1995 | Matsushita et al. | 523/213 |
| 5,412,135 | 5/1995 | Fukuda et al. | 556/448 |
| 5,545,682 | 8/1996 | Kaiya et al. | 524/265 |
| 5,545,831 | 8/1996 | Kaiya et al. | 524/31 |
| 5,625,022 | 4/1997 | Onishi | 528/15 |

*Primary Examiner*—James C. Housel
*Assistant Examiner*—Rodney P. Swartz
*Attorney, Agent, or Firm*—Timothy J. Troy

[57] ABSTRACT

The present invention relates to a curable silicone composition comprising (A) an alkenyl-functional organopolysiloxane, (B) a siloxane-modified acrylic polymer, (C) an organohydrogenpolysiloxane, and (D) a hydrosilylation reaction catalyst. The curable silicone compositions of this invention cure into a highly oil-resistant and highly wear-resistant coating and are useful as base compositions for inks for silicone moldings, and are also useful for imparting release against pressure sensitive adhesives while maintaining a degree of printability.

23 Claims, No Drawings

CURABLE SILICONE COMPOSITIONS

BACKGROUND OF THE INVENTION

This invention relates to curable silicone compositions. More specifically, this invention relates to a curable silicone composition which cures into a highly oil-resistant and highly wear-resistant coating and which is useful as the base composition for inks for silicone moldings, especially silicone rubber moldings.

Silicone rubber key pads are used, for example, in portable and cellular telephones and household remote control devices, and inks based on curable silicone compositions are used on these key pads. One problem with these silicone inks is that the cured ink layer swells and suffers from a reduced wear resistance due to the infiltration of oil and fatty acid components transferred from the surface of the finger when a key is pressed. Thus, there is demand for a curable silicone composition which can cure into a highly oil-resistant and highly wear-resistant coating and which will be useful as the base composition for inks in applications involving silicone rubber moldings.

SUMMARY OF THE INVENTION

The present invention relates to a curable silicone composition comprising (A) an alkenyl-functional organopolysiloxane, (B) a siloxane-modified acrylic polymer, (C) an organohydrogenpolysiloxane, and (D) a hydrosilylation reaction catalyst.

It is an object of this invention to provide a curable silicone composition which cures into a highly oil-resistant and highly wear-resistant coating.

It is another object of this invention to provide a curable silicone composition which is suitable for use as the base composition for inks used in silicone moldings, especially silicone rubber moldings.

DETAILED DESCRIPTION OF THE INVENTION

The present invention relates to a curable silicone composition comprising (A) 100 weight parts of an organopolysiloxane having at least 2 silicon-bonded alkenyl groups per molecule and having a viscosity of 100 to 100,000 centistokes, (B) 1 to 150 weight parts of an acrylic polymer having the formula

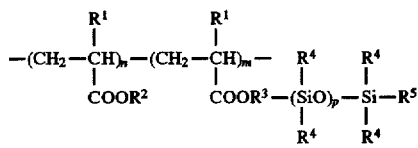

wherein $R^1$ is hydrogen or methyl, $R^2$ is a monovalent hydrocarbon group, $R^3$ is an alkylene group, $R^4$ is an alkyl group or an aryl group, $R^5$ is an alkenyl group, n is an integer having a value from 1 to 200, m is an integer having a value from 1 to 50, and p is an integer having a value from 1 to 200, (C) an organohydrogenpolysiloxane having at least 2 silicon-bonded hydrogen atoms per molecule in an amount sufficient to provide a ratio of 1:0.4 to 1:50 moles of alkenyl groups in component (A) to moles of silicon-bonded hydrogen atoms in Component (C) with the proviso that when component (A) is an organopolysiloxane having 2 silicon-bonded alkenyl groups per molecule then component (C) must have at least 3 silicon-bonded hydrogen groups per molecule, and (D) a catalytic quantity of a hydrosilylation reaction catalyst.

The organopolysiloxane (A) used in the present invention must contain at least 2 alkenyl groups per molecule. The molecular structure of component (A) is not critical and is exemplified by straight-chain, partially branched straight-chain, resin, network, and cyclic structures with straight-chain and partially branched straight-chain structures being preferred. The alkenyl group of component (A) is specifically exemplified by vinyl, allyl, butenyl, pentenyl, and hexenyl, with vinyl being preferred. The bonding position for the alkenyl group is not critical and it may be bonded in a terminal or nonterminal position on the molecular chain. The remaining groups in component (A) are exemplified by alkyl groups such as methyl, ethyl, propyl, butyl, hexyl, or octyl, aryl groups such as phenyl, tolyl, or xylyl, aralkyl groups such as benzyl or phenethyl, and substituted alkyl groups such as 3-chloropropyl or 3,3,3-trifluoropropyl. It is preferred that the remaining groups are methyl. Component (A) must have a viscosity at 25° C. in the range from 100 to 100,000 centistokes because the mechanical strength of the composition declines when component (A) has a viscosity below 100 centistokes, and a viscosity of greater than 100,000 centistokes impairs the coatability of the composition. Component (A) is exemplified by dimethylvinylsiloxy-endblocked dimethylpolysiloxanes, dimethylvinylsiloxy-endblocked methylvinylpolysiloxanes, dimethylvinylsiloxy-endblocked methylphenylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-methylvinylsiloxane-methylphenylsiloxane copolymers, trimethylsiloxy-endblocked dimethylsiloxane-methylvinylsiloxane copolymers, trimethylsiloxy-endblocked dimethylsiloxane-methylvinylsiloxane-methylphenylsiloxane copolymers, dimethylhydroxysiloxy-endblocked methylvinylpolysiloxanes, dimethylhydroxysiloxy-endblocked dimethylsiloxane-methylvinylsiloxane copolymers, and dimethylhydroxysiloxy-endblocked dimethylsiloxane-methylvinylsiloxane-methylphenylsiloxane copolymers.

Component (B) is a compound having the general formula

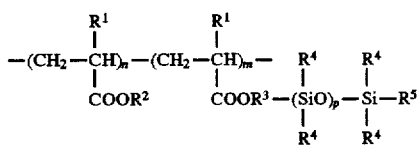

In the above formula, $R^1$ is selected from hydrogen or methyl, $R^2$ is a monovalent hydrocarbon group exemplified by alkyl groups such as methyl, ethyl, or propyl and cycloalkyl groups such as cyclohexyl or cyclopentyl, $R^3$ is an alkylene group exemplified by methylene, ethylene, propylene, and butylene, and $R^4$ is an alkyl group as described above, or an aryl group such as phenyl and tolyl, and $R^5$ is an alkenyl group exemplified by vinyl, allyl, and hexenyl with vinyl being preferred. The subscript n is an integer from 1 to 200 and m is an integer from 1 to 50, preferably from 1 to 20. The subscript p is an integer from 1 to 200, preferably from 1 to 10. Moreover, it is preferred that the value of n is greater than p. The identity of the chain terminals of the acrylic polymer (B) is not critical. It is well known in the art that the chain terminals are determined by the particular free radical generator selected in the reaction to prepare acrylic polymer (B) or by the particular chain transfer agent chosen to terminate the polymerization reaction during the preparation of component (B), which is described hereinbelow. The acrylic polymer of component (B) can be prepared by the copolymerization of an acrylic or methacrylic monomer with a heterodifunctional oligosiloxane. As used herein heterodifunctional oligosiloxane refers to a siloxane having a low degree of polymerization that contains both (meth)acrylic and alkenylsilyl functional groups in the same molecule. The (meth)acrylic monomer is exemplified by methyl acrylate, ethyl acrylate, n-butyl acrylate, isobutyl acrylate, cyclohexyl acrylate, 2-ethylhexyl acrylate, methyl methacrylate, ethyl methacrylate, n-butyl methacrylate, isobutyl methacrylate, cyclohexyl methacrylate, and 2-ethylhexyl methacrylate. The heterodifunctional oligosiloxane includes compounds having the formula

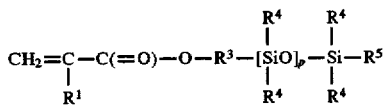

wherein $R^1$, $R^3$, $R^4$, $R^5$, and p are defined as above. The heterodifunctional oligosiloxane can itself be synthesized by the condensation of an alkenyldialkylmonochlorosilane with an acryloxyalkylmonosilanol or methacryloxyalkylmonosilanol. The heterodifunctional oligosiloxane can also be synthesized by the nonequilibration polymerization of a cyclic hexaorganotrisiloxane using the alkali metal salt of alkenyl- plus hydroxy-functional organosilane or organopolysiloxane as the polymerization initiator and by endblocking the resulting polymer with acryloxy-functional or methacryloxy-functional diorganochlorosilane such as is described in Japanese Patent Application Laid-Open No. 1-252616 (252,616/1989). In addition to the methacrylic monomer, small amounts of other vinyl monomer may be copolymerized into component (B) insofar as the objects of the present invention are not impaired. This other vinyl monomer is exemplified by styrene, butadiene, and acrylonitrile. Component (B) should have a molecular weight from 500 to 500,000 and preferably from 5,000 to 100,000. The synthesis of component (B) having a molecular weight below 500 is quite difficult, while the compatibility with component (A) declines at molecular weights in excess of 500,000. Component (B) can have a straight-chain or branched structure.

Component (B) is added at from 1 to 150 weight parts per 100 weight parts component (A) and preferably at from 5 to 100 weight parts per 100 weight parts component (A).

Component (C) used in the present invention, which is a crosslinker for components (A) and (B), must contain at least 2 silicon-bonded hydrogen atoms in each molecule. When component (A) is an organopolysiloxane having 2 silicon-bonded alkenyl groups in each molecule, component (C) must then be an organohydrogenpolysiloxane having at least 3 silicon-bonded hydrogen atoms in each molecule. While the viscosity of component (C) is not critical, a viscosity in the range from 10 to 5,000 centistokes is desirable. The molecular structure of component (C) is also not critical and is exemplified by straight-chain, partially branched straight-chain, resin, network, and cyclic structures with straight-chain and partially branched straight-chain structures being preferred. The bonding position for the silicon-bonded hydrogen in component (C) is not crucial and it may be present at a terminal or nonterminal position on the molecular chain. The silicon-bonded organic groups in component (C) are exemplified by alkyl groups such as methyl, ethyl, propyl, butyl, hexyl, or octyl; aryl groups such as phenyl, tolyl, or xylyl; aralkyl groups such as benzyl or phenethyl, and substituted alkyl groups such as 3-chloropropyl or 3,3,3-trifluoropropyl, with methyl being preferred. Component (C) is exemplified by dimethylhydrogensiloxy-endblocked dimethylpolysiloxanes, dimethylhydrogensiloxy-endblocked methylhydrogenpolysiloxanes, dimethylhydrogensiloxy-endblocked methylphenylpolysiloxanes, dimethylhydrogensiloxy-endblocked dimethylsiloxane-methylhydrogensiloxane copolymers, dimethylhydrogensiloxy-endblocked dimethylsiloxane-methylphenylsiloxane copolymers, dimethylhydrogensiloxy-endblocked dimethylsiloxane-methylhydrogensiloxane-methylphenylsiloxane copolymers, trimethylsiloxy-endblocked dimethylsiloxane-methylhydrogensiloxane copolymers, trimethylsiloxy-endblocked dimethylsiloxane-methylhydrogensiloxane-methylphenylsiloxane copolymers, dimethylhydroxysiloxy-endblocked methylhydrogenpolysiloxanes, dimethylhydroxysiloxy-endblocked dimethylsiloxane-methylhydrogensiloxane copolymers, and dimethylhydroxysiloxy-endblocked dimethylsiloxane-methylhydrogensiloxane-methylphenylsiloxane copolymers.

Component (C) is added in a quantity which provides a ratio of 1:0.4 to 1:50 moles of alkenyl groups in Component (A) to moles of silicon-bonded hydrogen atoms in Component (C). When this ratio is below 0.4 the resulting silicone composition will not undergo a thorough cure and therefore from a practical perspective cannot be used as a base composition for inks. When this ratio exceeds 50 component (C) will bleed onto the surface of the cured film afforded by the composition of this invention.

The hydrosilylation reaction catalyst (D) is a catalyst that accelerates the cure of the composition of the invention, and is exemplified by transition metal catalysts known to catalyze hydrosilylation reactions. In specific terms this catalyst is exemplified by platinum catalysts such as chloroplatinic acid, alcohol-modified chloroplatinic acid, chloroplatinic acid-olefin complexes, divinyltetramethyldisiloxane complexes of platinum and chloroplatinic acid, platinum supported on alumina or silica or carbon black, platinum black, palladium catalysts such as tetrakis(triphenylphosphine) palladium, and rhodium catalysts. The divinyltetramethyldisiloxane complexes of platinum and chloroplatinic acid are preferred for their high catalytic activities and excellent compatibilities with components (A) and (C). Component (D) is added in a catalytic quantity, generally at 0.000001 to 0.1 weight part, and preferably at 0.00005 to 0.01 weight part, in each case as platinum per 100 weight parts of the total amount of components (A) plus (B). In the case of a transition metal other than platinum, the "as platinum" weight designates the weight calculated for the addition of the number of platinum atoms equivalent to the actually added transition metal. The addition of component (D) at less than 0.000001 weight part as platinum per 100 weight parts components (A) plus (B) yields a curable silicone composition with an extremely slow cure rate. The addition of component (D) in excess of 0.1 weight part as platinum per 100 weight parts components (A) plus (B) is uneconomical.

The composition of this invention is a curable silicone composition comprising components (A) to (D) described above. In addition to components (A) to (D), the compositions of this invention may contain various additives on an optional basis insofar as the objects of the invention are not impaired, for example, microparticulate silicas such as fumed silicas and wet-process silicas, surfacehydrophobicized microparticulate silicas, various organic solvents compatible with component (B) such as toluene and xylene, storage stabilizers (inhibitors) including acetylenic alcohols such as phenylbutynol, ethynylcyclohexanol, and methylbutynol, unsaturated carboxylic esters such as diallyl maleate and dimethyl maleate, maleates and fumarates, including diethyl fumarate, diallyl fumarate, and bis-(methoxyisopropyl) maleate, conjugated ene-ynes such as 3,5-dimethyl-3-hexene-1-yne, 3-methyl-3-pentene-1-yne, and 3-methyl-3-hexene-1-yne, and triallyl isocyanurate, heat stabilizers, and flame retardants.

The composition of this invention can be prepared simply by mixing components (A) to (D) to homogeneity. The method for preparing the composition according to the present invention is not crucial, and the composition can be prepared simply by mixing components (A) to (D) to homogeneity in a mixer, for example, a Ross mixer, planetary mixer, Henschel mixer, butterfly mixer, or Hobart mixer. The composition according to the present invention can be cured simply by standing at room temperature or by heating, but it is preferably cured by heating at temperatures from 80° C. to 250° C.

In its application as an ink base, the composition according to this invention is blended with any of the various pigments as known in the art for the preparation of, for example, printing inks, in order to give a curable silicone ink composition. Examples of the pigment are microparticulate carbon black, microparticulate titanium oxide, and microparticulate iron oxide red. The use of pigments that inhibit the cure of the composition of this invention should be avoided.

The composition according to the present invention cures to give a cured film or coating that is very oil resistant and wear resistant and that is also highly adherent to substrates such as silicone moldings in general and to silicone rubber moldings in particular. These features make this composition very useful as a base composition for inks applied to substrates such as silicone rubber key pads, for example, in portable and cellular telephones, and household remote control devices. The compositions of this invention are also useful for imparting release against pressure sensitive adhesives while maintaining a degree of printability.

Thus, in another aspect the present invention relates to a coated article obtained by a method comprising (I) applying a curable silicone coating composition on the surface of a substrate wherein the composition is prepared by mixing components A–D, and optionally a storage stabilizer and/or a pigment. The method can further comprise (II) exposing the coating and substrate to heat in an amount sufficient to cure the coating. The method can also comprise applying a pressure sensitive adhesive on the coated substrate after step (II).

By heat it is meant infrared radiation, hot-air, or microwave radiation. In this method of this invention, the application of the silicone release coating composition to the substrate can be accomplished by any suitable manner known in the art, such as by spreading, brushing, extruding, spraying, gravure, kiss-roll and air-knife.

The solid substrate can be a silicone molding, for example a silicone rubber molding, a flexible sheet material such as paper, polyolefin film, polyolefin-coated paper, foil, plastic film, woven cloth, or nonwoven cloth. Other suitable solid substrates that can be coated by the method of this invention include other cellulosic materials such as wood, cardboard and cotton, metallic materials such as aluminum, copper, steel and silver, siliceous materials such as glass and stone, and synthetic polymer materials such as polyolefins, polyamides, polyesters and polyacrylates. As to the form of the solid substrate, it can be substantially sheet-like, such as a peelable release liner for pressure sensitive adhesive, a fabric or a foil, or substantially three-dimensional in form.

In the examples below, "part" denotes "weight part" and the values reported for the viscosity were measured at 25° C.

EXAMPLE 1

The following were introduced into a Ross mixer and mixed at 170° C. in a vacuum to give a silicone rubber base compound: 70 parts of a dimethylvinylsiloxy-endblocked dimethylpolysiloxane having a viscosity of 10,000 centistokes, 15 parts of fumed silica having a BET specific surface of 200 m²/g, 5 parts of hexamethyldisilazane, and 1.5 parts water. Then, the following were added and mixed to homogeneity per 100 weight parts of this silicone rubber base compound: 30 parts of an acrylic polymer having the average formula

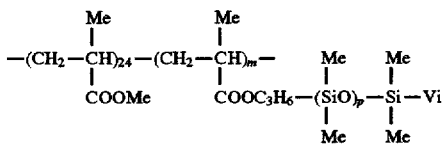

wherein Me denotes methyl and Vi denotes vinyl, 30 parts of toluene, and 15 parts of carbon black (Denka Acetylene Black from Denki Kagaku Kogyo Kabushiki Kaisha). This was followed by additional mixing to homogeneity on a three-roll mill. Finally, the following were added with mixing to homogeneity to yield the curable silicone composition: 0.22 parts of a 2-ethylhexanol solution of chloroplatinic acid (having a chloroplatinic acid content of 0.03 weight %) and 7 parts of a trimethylsiloxy-endblocked methylhydrogenpolysiloxane containing 1.57 weight % silicon-bonded hydrogen atoms. The acrylic polymer used in this example was prepared by the radical polymerization of methyl methacrylate with 1-(3-methacryloxypropyl)-1,1,3,3-tetramethyl-3-vinyldisiloxane in the presence of azo bisisobutyronitrile. The properties of this composition as an ink were then evaluated as follows: the composition was screen printed onto a 2 mm-thick silicone rubber sheet (SH851U from Dow Corning Toray Silicone Company, Limited) so as to give a post-cure film thickness (ink thickness) of 30 micrometers, and this was followed by curing in an oven at 200° C. for 30 minutes to provide a wear resistance test specimen. This test specimen was installed in a rubbing tester from Taihei Rika Kogyo Kabushiki Kaisha for evaluation of ink durability. In this rubbing tester, a Band eraser (surface area corresponding to a diameter of 8 mm) as the abrasive was moved back-and-forth at 50 cycles (1 cycle=1 back-and-forth excursion) per 1 minute using a 65 mm stroke. In the evaluation, the "withstand cycles" of the ink was designated as the number of cycles at which scratching or blurring of the letters was first observed. These results are reported in Table 1.

For purposes of comparison, a curable silicone composition was prepared as above, but in this case without the addition of the acrylic polymer. The ink durability of this composition was also evaluated as above, and these results are reported in Table 1.

EXAMPLE 2

The following were introduced into a Ross mixer and mixed at 170° C. in a vacuum to give a silicone rubber base compound: 100 parts of dimethylvinylsiloxy-endblocked dimethylpolysiloxane as described in Example 1, 45 parts of fumed silica with a BET specific surface of 200 m²/g, 10 parts of hexamethyldisilazane, and 2.5 parts of water. Then, the following were added and mixed to homogeneity per 72 weight parts of this silicone rubber base compound: 50 parts of an acrylic polymer having the average formula

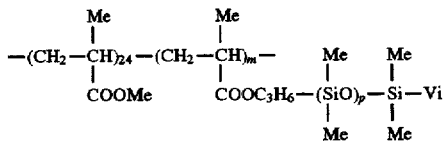

and 50 parts of toluene. Finally, the following were added with mixing to homogeneity to yield the curable silicone composition: 5 parts of trimethylsiloxy-endblocked dimethylsiloxane-methylhydrogensiloxane copolymer containing 0.75 weight % silicon-bonded hydrogen as crosslinker and 0.6 parts of chloroplatinic acid/divinyltetramethyldisiloxane complex as platinum catalyst. An oil resistance test specimen (6×40×60 mm) was prepared by press-curing the composition at 80° C. for 30 minutes. The volumetric swelling was then measured during immersion of the test specimen in salad oil or olive oil at 40° C. These results are reported in Table 2.

For purposes of comparison, a curable silicone composition was prepared as above, but in this case without the addition of the acrylic polymer. The oil resistance of this composition was also tested as above, and these results are reported in Table 2.

TABLE 1

|  | Example 1 | Comparative Example 1 |
|---|---|---|
| withstand cycles | 2500 | 1000 |

TABLE 2

|  | Example 2 | | Comparative Example 2 | |
|---|---|---|---|---|
|  | salad oil | olive oil | salad oil | olive oil |
| after 3 days | 0 | 0 | 2.2 | 1.2 |
| after 5 days | 0 | 0 | 3.0 | 2.0 |
| after 7 days | 0 | 0 | 3.5 | 2.5 |

That which is claimed is:

1. A curable silicone composition comprising:

(A) 100 weight parts of an organopolysiloxane having at least 2 silicon-bonded alkenyl groups per molecule and having a viscosity of 100 to 100,000 centistokes;

(B) 1 to 150 weight parts of an acrylic polymer having the formula

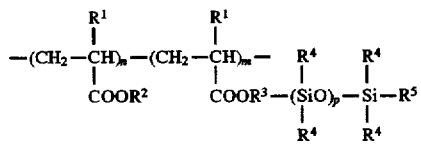

wherein $R^1$ is hydrogen or methyl, $R^2$ is a monovalent hydrocarbon group, $R^3$ is an alkylene group, $R^4$ is an alkyl group or an aryl group, $R^5$ is an alkenyl group, n is an integer having a value from 1 to 200, m is an integer having a value from 1 to 50, and p is an integer having a value from 1 to 200;

(C) an organohydrogenpolysiloxane having at least 2 silicon-bonded hydrogen atoms per molecule in an amount sufficient to provide a ratio of 1:0.4 to 1:50 moles of alkenyl groups in component (A) to moles of silicon-bonded hydrogen atoms in Component (C) with the proviso that when component (A) is an organopolysiloxane having 2 silicon-bonded alkenyl groups per molecule then component (C) must have at least 3 silicon-bonded hydrogen groups per molecule; and (D) a catalytic quantity of a hydrosilylation reaction catalyst.

2. A composition according to claim 1, wherein (A) is selected from the group consisting of dimethylvinylsiloxy-endblocked dimethylpolysiloxanes, dimethylvinylsiloxy-endblocked methylvinylpolysiloxanes, dimethylvinylsiloxy-endblocked methylphenylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-methylvinylsiloxane-methylphenylsiloxane copolymers, trimethylsiloxy-endblocked dimethylsiloxane-methylvinylsiloxane copolymers, trimethylsiloxy-endblocked dimethylsiloxane-methylvinylsiloxane-methylphenylsiloxane copolymers, dimethylhydroxysiloxy-endblocked methylvinylpolysiloxanes, dimethylhydroxysiloxy-endblocked dimethylsiloxane-methylvinylsiloxane copolymers, and dimethylhydroxysiloxy-endblocked dimethylsiloxane-methylvinylsiloxane-methylphenylsiloxane copolymers.

3. A composition according to claim 1, wherein $R^1$, $R^2$, and $R^4$ are methyl, $R^3$ is propylene, $R^5$ is vinyl, m is an integer from 1 to 20, and p is an integer from 1 to 10.

4. A composition according to claim 1, wherein (C) is selected from the group consisting of dimethylhydrogensiloxy-endblocked dimethylpolysiloxanes, dimethylhydrogensiloxy-endblocked methylhydrogenpolysiloxanes, dimethylhydrogensiloxy-endblocked methylphenylpolysiloxanes, dimethylhydrogensiloxy-endblocked dimethylsiloxane-methylhydrogensiloxane copolymers, dimethylhydrogensiloxy-endblocked dimethylsiloxane-methylphenylsiloxane copolymers, dimethylhydrogensiloxy-endblocked dimethylsiloxane-methylhydrogensiloxane-methylphenylsiloxane copolymers, trimethylsiloxy-endblocked dimethylsiloxane-methylhydrogensiloxane copolymers, trimethylsiloxy-endblocked dimethylsiloxane-methylhydrogensiloxane-methylphenylsiloxane copolymers, dimethylhydroxysiloxy-endblocked methylhydrogenpolysiloxanes, dimethylhydroxysiloxy-endblocked dimethylsiloxane-methylhydrogensiloxane copolymers, and dimethylhydroxysiloxy-endblocked dimethylsiloxane-methylhydrogensiloxane-methylphenylsiloxane copolymers.

5. A composition according to claim 1, wherein (D) is selected from the group consisting of chloroplatinic acid, alcohol-modified chloroplatinic acid, chloroplatinic acid-olefin complexes, divinyltetramethyldisiloxane complexes of platinum and chloroplatinic acid, platinum supported on alumina, platinum supported on silica, platinum supported on carbon black, platinum black, palladium catalysts, and rhodium catalysts.

6. A composition according to claim 1, wherein the composition further comprises at least one ingredient selected from the group consisting of silica, water, solvents, storage stabilizers, heat stabilizers, and flame retardents.

7. A composition according to claim 6, wherein the storage stabilizer is selected from the group consisting of acetylenic alcohols, unsaturated carboxylic esters, conjugated ene-ynes, and triallyl isocyanurate.

8. A composition according to claim 1, wherein the composition further comprises a pigment.

9. A composition according to claim 8, wherein the pigment is selected from the group consisting of microparticulate carbon black, microparticulate titanium oxide, and microparticulate iron oxide red.

10. A curable silicone composition obtained by a method comprising (I) mixing:

(A) 100 weight parts of an organopolysiloxane having at least 2 silicon-bonded alkenyl groups per molecule and having a viscosity of 100 to 100,000 centistokes;

(B) 1 to 150 weight parts of an acrylic polymer having the formula

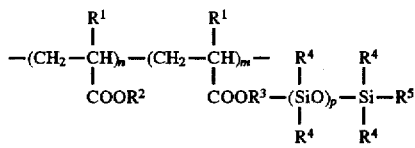

wherein $R^1$ is hydrogen or methyl, $R^2$ is a monovalent hydrocarbon group, $R^3$ is an alkylene group, $R^4$ is an alkyl group or an aryl group, $R^5$ is an alkenyl group, n is an integer having a value from 1 to 200, m is an integer having a value from 1 to 50, and p is an integer having a value from 1 to 200;

(C) an organohydrogenpolysiloxane having at least 2 silicon-bonded hydrogen atoms per molecule in an amount sufficient to provide a ratio of 1:0.4 to 1:50 moles of alkenyl groups in component (A) to moles of silicon-bonded hydrogen atoms in Component (C) with the proviso that when component (A) is an organopolysiloxane having 2 silicon-bonded alkenyl groups per molecule then component (C) must have at least 3 silicon-bonded hydrogen groups per molecule; and (D) a catalytic quantity of a hydrosilylation reaction catalyst.

11. A composition according to claim 10, wherein (A) is selected from the group consisting of dimethylvinylsiloxy-endblocked dimethylpolysiloxanes, dimethylvinylsiloxy-endblocked methylvinylpolysiloxanes, dimethylvinylsiloxy-endblocked methylphenylpolysiloxanes, dimethylvinylsiloxy-endblocked dimethylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-methylvinylsiloxane-methylphenylsiloxane copolymers, trimethylsiloxy-endblocked dimethylsiloxane-methylvinylsiloxane copolymers, trimethylsiloxy-endblocked dimethylsiloxane-methylvinylsiloxane-methylphenylsiloxane copolymers, dimethylhydroxysiloxy-endblocked methylvinylpolysiloxanes, dimethylhydroxysiloxy-endblocked dimethylsiloxane-methylvinylsiloxane copolymers, and dimethylhydroxysiloxy-endblocked dimethylsiloxane-methylvinylsiloxane-methylphenylsiloxane copolymers.

12. A composition according to claim 10, wherein $R^1$, $R^2$, and $R^4$ are methyl, $R^3$ is propylene, $R^5$ is vinyl, m is an integer from 1 to 20, and p is an integer from 1 to 10.

13. A composition according to claim 10, wherein (C) is selected from the group consisting of dimethylhydrogensiloxy-endblocked dimethylpolysiloxanes, dimethylhydrogensiloxy-endblocked methylhydrogenpolysiloxanes, dimethylhydrogensiloxy-endblocked methylphenylpolysiloxanes, dimethylhydrogensiloxy-endblocked dimethylsiloxane-methylhydrogensiloxane copolymers, dimethylhydrogensiloxy-endblocked dimethylsiloxane-methylphenylsiloxane copolymers, dimethylhydrogensiloxy-endblocked dimethylsiloxane-methylhydrogensiloxane-methylphenylsiloxane copolymers, trimethylsiloxy-endblocked dimethylsiloxane-methylhydrogensiloxane copolymers, trimethylsiloxy-endblocked dimethylsiloxane-methylhydrogensiloxane-methylphenylsiloxane copolymers, dimethylhydroxysiloxy-endblocked methylhydrogenpolysiloxanes, dimethylhydroxysiloxy-endblocked dimethylsiloxane-methylhydrogensiloxane copolymers, and dimethylhydroxysiloxy-endblocked dimethylsiloxane-methylhydrogensiloxane-methylphenylsiloxane copolymers.

14. A composition according to claim 10, wherein (D) is selected from the group consisting of chloroplatinic acid, alcohol-modified chloroplatinic acid, chloroplatinic acid-olefin complexes, divinyltetramethyldisiloxane complexes of platinum and chloroplatinic acid, platinum supported on alumina, platinum supported on silica, platinum supported on carbon black, platinum black, palladium catalysts, and rhodium catalysts.

15. A composition according to claim 10, wherein the method further comprises adding at least one ingredient selected from the group consisting of silica, water, solvents, storage stabilizers, heat stabilizers, and flame retardents during step (I).

16. A composition according to claim 15, wherein the storage stabilizer is selected from the group consisting of acetylenic alcohols, unsaturated carboxylic esters, conjugated ene-ynes, and triallyl isocyanurate.

17. A composition according to claim 10, wherein the method further comprises adding a pigment during step (I).

18. A composition according to claim 15, wherein the method further comprises adding a pigment during step (I).

19. A composition according to claim 17, wherein the pigment is selected from the group consisting of microparticulate carbon black, microparticulate titanium oxide, and microparticulate iron oxide red.

20. A composition according to claim 18, wherein the pigment is selected from the group consisting of microparticulate carbon black, microparticulate titanium oxide, and microparticulate iron oxide red.

21. A coated article obtained by a method comprising:

(I) applying a curable silicone composition on the surface of a substrate wherein the curable silicone composition is obtained by mixing:

(A) 100 weight parts of an organopolysiloxane having at least 2 silicon-bonded alkenyl groups per molecule and having a viscosity of 100 to 100,000 centistokes;

(B) 1 to 150 weight parts of an acrylic polymer having the formula

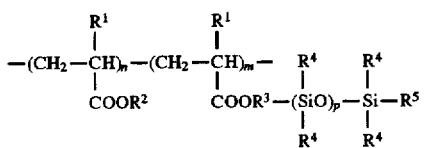

wherein $R^1$ is hydrogen or methyl, $R^2$ is a monovalent hydrocarbon group, $R^3$ is an alkylene group, $R^4$ is an alkyl group or an aryl group, $R^5$ is an alkenyl group, n is an integer having a value from 1 to 200, m is an integer having a value from 1 to 50, and p is an integer having a value from 1 to 200;

(C) an organohydrogenpolysiloxane having at least 2 silicon-bonded hydrogen atoms per molecule in an amount sufficient to provide a ratio of 1:0.4 to 1:50 moles of alkenyl groups in component (A) to moles of silicon-bonded hydrogen atoms in Component (C) with the proviso that when component (A) is an organopolysiloxane having 2 silicon-bonded alkenyl groups per molecule then component (C) must have at least 3 silicon-bonded hydrogen groups per molecule; and (D) a catalytic quantity of a hydrosilylation reaction catalyst.

22. A coated article according to claim 21, wherein the method further comprises (II) exposing the coating and the substrate to heat in an amount sufficient to cure the coating.

23. A coated article according to claim 22, wherein the method further comprises applying a pressure sensitive adhesive on the coated substrate after step (II).

* * * * *